United States Patent
Overy

[15] 3,670,317
[45] June 13, 1972

[54] INSTRUMENT DRIVE SYSTEM FOR FLUID METERING

[72] Inventor: Lester R. Overy, Fort Wayne, Ind.
[73] Assignee: Tokheim Corporation
[22] Filed: March 16, 1971
[21] Appl. No.: 124,844

[52] U.S. Cl..............................340/198, 340/192, 340/203
[51] Int. Cl. ...................................G08c 19/48, G08c 19/16
[58] Field of Search...................................340/198, 203, 192

[56] References Cited

UNITED STATES PATENTS 2,529,481  11/1950  Brewer..................................340/198
2,817,053  12/1957  Schurr...................................340/198

Primary Examiner—Thomas B. Habecker
Attorney—Stan C. Kaiman and Edmund W. E. Kamm

[57] ABSTRACT

The invention relates to an improvement in a fluid metering apparatus which, in the prior art, commonly comprises three or more elements mounted together in stacked, interfitting relationship, wherein the lowermost element is a meter having an output shaft, wherein the intermediate element or elements have input and output shaft means, wherein the uppermost element has at least an input shaft and wherein the input shaft of each element is coupled with the output shaft means of the subjacent element.

20 Claims, 15 Drawing Figures

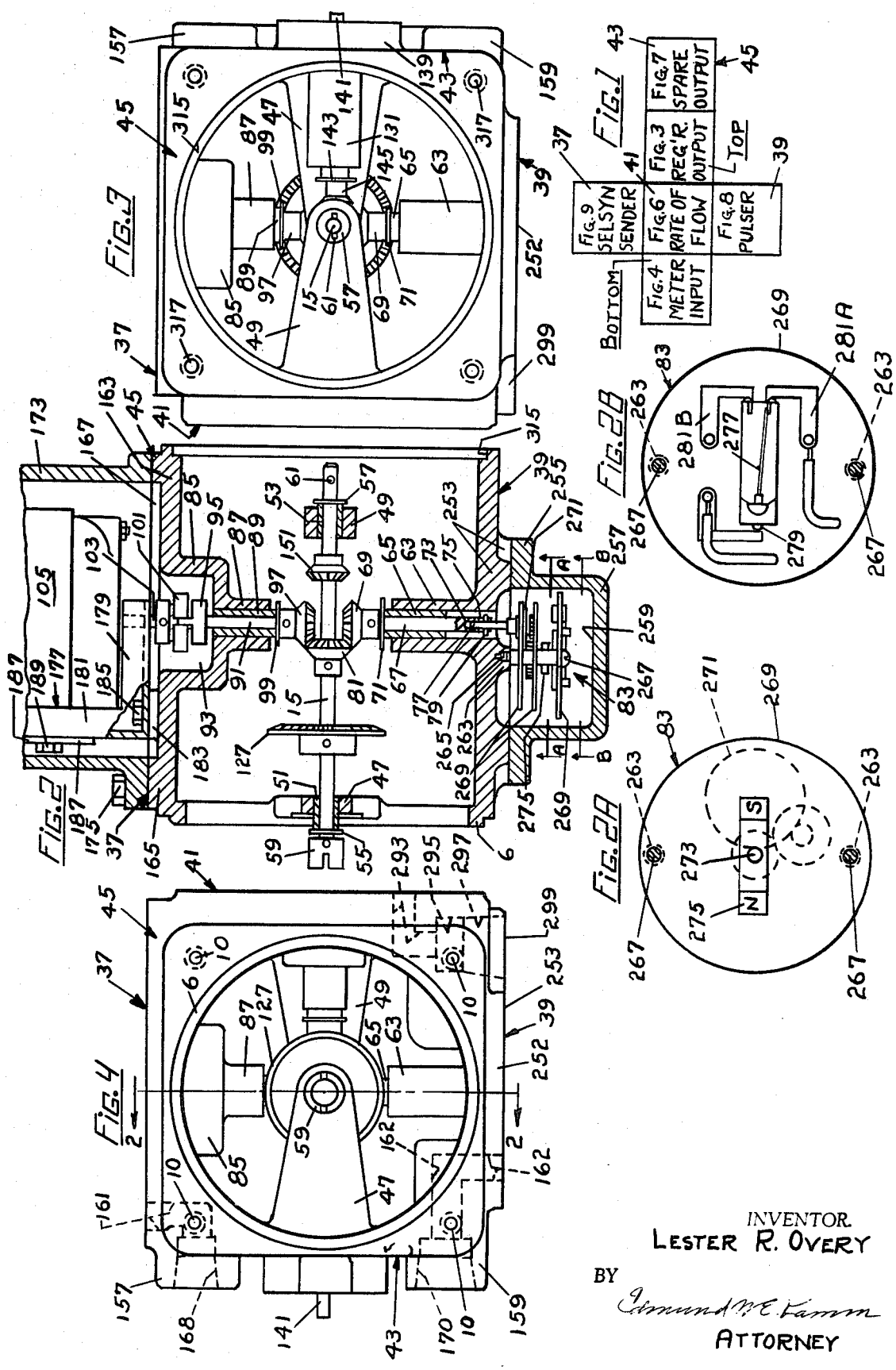

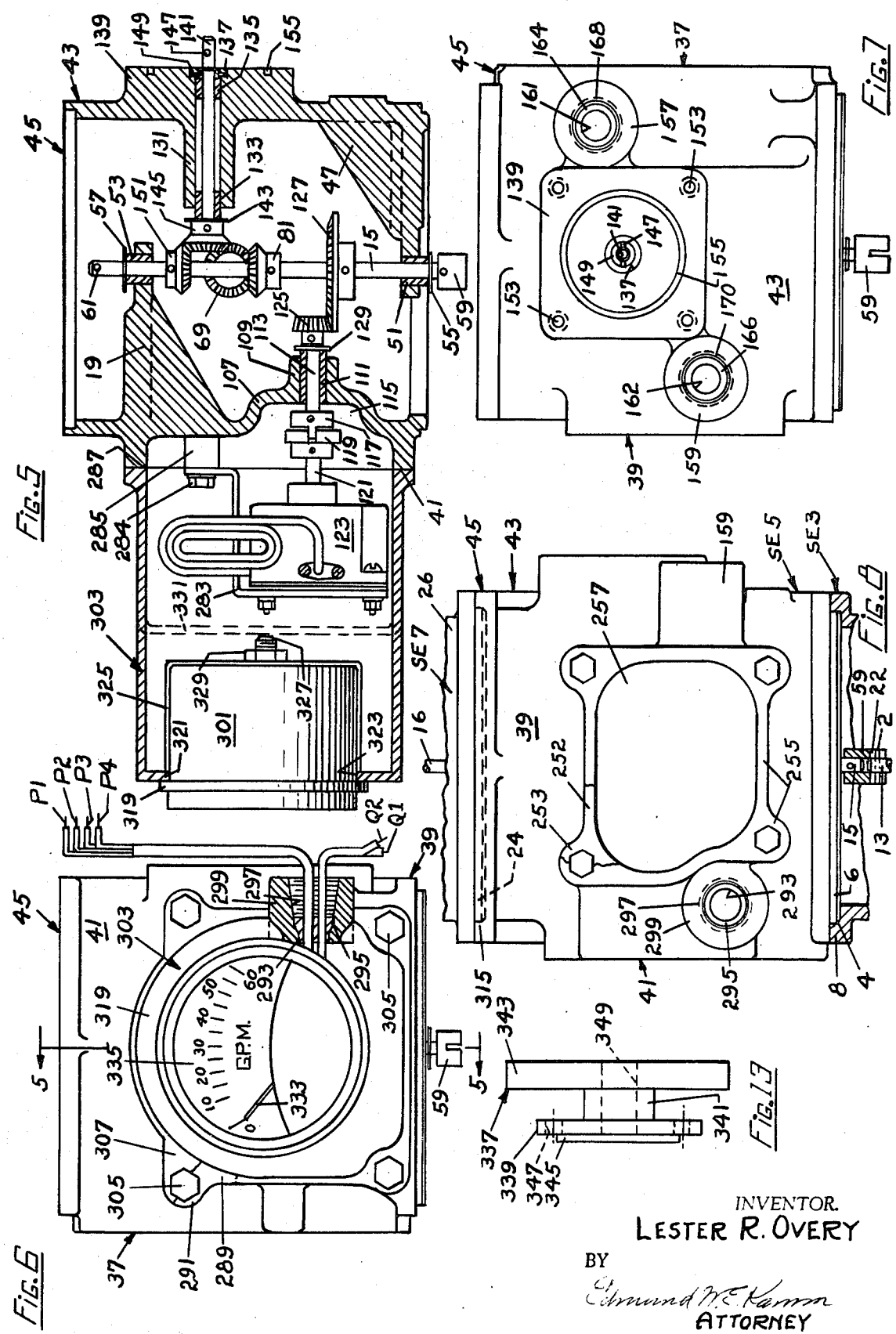

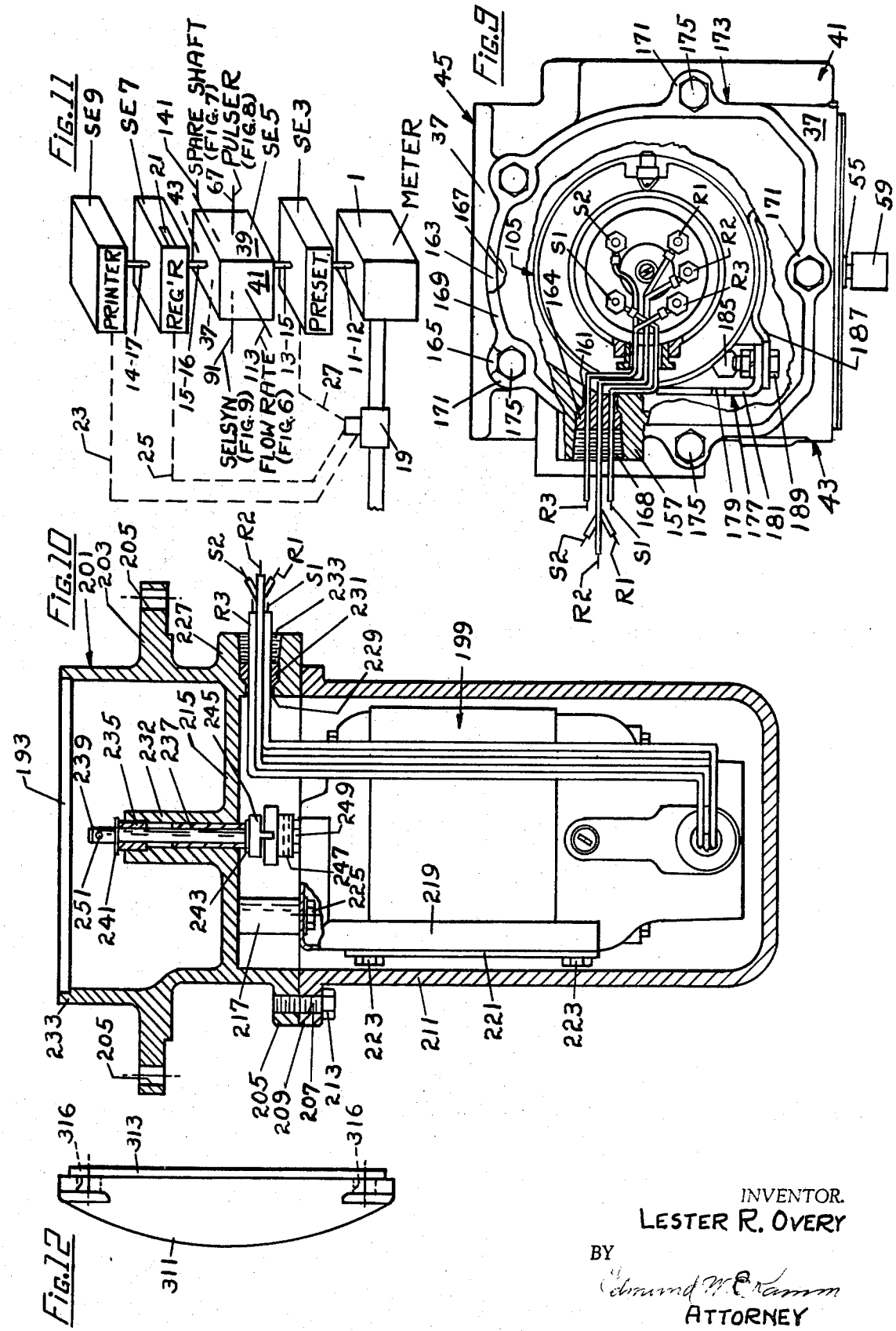

INSTRUMENT DRIVE SYSTEM FOR FLUID METERING

The invention contemplates the provision of a new stack element having a body, the top and bottom ends of which are formed to interfit with the bodies of the prior art elements. The body also supports first input-output shaft means disposed for coupling with the output and input shafts of the adjacent prior art elements. A plurality of other output shafts are mounted in the body to extend radially therefrom and are connected to be driven by the first shaft means. The body further defines a lateral face surrounding each radial shaft, which is formed to support a transmission or other device, with its input shaft in alignment with the corresponding radial shaft for coupling therewith. In some cases such face is formed to support and seal with a cover for the device.

The new stack element is thus capable of being assembled in the various prior art stacks without any modification of the existing stack elements. It provides outputs which may be utilized to drive additional instruments at the metering station, at a different station or both. It is also usable with the meter alone to provide, at a point remote from the metering station, the data which is necessary to enable the metering apparatus to be operated entirely by remote control.

Further the unitary construction of the multiple output element makes possible the accurate alignment and connection of the various radial output and device shafts so as to minimize frictional torque loads which would be applied to the meter.

BACKGROUND OF THE INVENTION

The invention relates to improvements in fluid metering apparatus and particularly liquid volume metering apparatus. The basic form of the apparatus includes a meter having a displacement mechanism which rotates an output shaft in proportion to the volume displaced, a register which is driven by said shaft and which has visible indicators for displaying the number of units of volume dispensed through the meter and a valve for stopping and starting the flow through the meter.

The register of the basic apparatus is a "local" instrument because the data are displayed at the metering station and are initially used by the operator of the apparatus to guide him in operating it. The data when transcribed by the operator forms a written record which is usable in carrying out a more comprehensive process of some kind. This kind of record is used to guide the billing of a customer for the quantity dispensed by the merchant in a sales transaction, or it might be used to guide accounting operations for in-plant transfers of liquid from one department to another. Again it might be used with other data to determine shrinkage of stored liquid, erroneous billing by the suppliers to the merchant, etc. For all of these uses and many more, the accuracy and reliability of the data available is of primary importance.

The structural development of the basic apparatus reflects the many efforts which have been made to improve these two factors and to extend the utility of the apparatus. To mention some of the steps taken in the course of said development, one of the early instruments to be used on the basic combination was a resettable register together with an interlock which prevented opening of the valve until the register had been reset. This was substituted for the prior register. A cumulative register (usually installed in the resettable register) provided the volumetric data in the form of a total of all the deliveries made over a period. A presettable predeterminer was added to eliminate some of the human error from the dispensing operation. Gravity, temperature and similar compensating devices were included in the combination to provide better accuracy of delivery. A ticket printer was also added as an element of the combination, with additional interlock means to compel the operator to follow a prescribed cycle of operation. The printer also extended the utility of the combination not only because it presented the data as a printed record but because it was capable of printing additional data with multiple copies so that, with minor write-in data, it could be used as the bill and would be given to the customer by the operator.

Thus the dispensing apparatus used for various transactions could be comprised of a meter and any or all of the various elements described above. Additional elements, of which the cost computer is an example, might be included in the combination. The specific apparatus which is needed by a customer of the apparatus manufacturer would be shipped as a package in which the various elements of the apparatus are mounted in a vertical "stack" on the meter. The bodies of the meter and the various elements are formed so that respective bottom ends thereof interfit with the top ends of the subjacent elements and so as to be held in place relative to each other by suitable fasteners. Further, the elements have input and output shaft means, provided with separable coupling means which are engageable incident to the assembly of the "stack" so that all of the elements will be driven when the meter output shaft rotates.

All of the instrument elements mentioned are "local" instruments as defined above. The current trend of the "comprehensive process," in which the dispensing apparatus plays a part, is toward the increasing use of monitored, remotely controlled, computer controlled, credit card controlled, customer operated systems and other systems which are made possible by our growing technology. In such systems, instruments which display or record data or otherwise respond to the metering apparatus are "remotely" located with respect to the metering apparatus. Accordingly, a device, usually called a transmitter, must be included as an element of the metering apparatus. This poses serious problems for the "package" manufacturer.

He must retain the capability of producing the various combinations of elements which include the local instruments. He must also somehow provide for the addition of transmitting devices to these combinations and he must make provision for substituting transmitting devices for some or all of the local elements of the stack.

The problem is further complicated by the fact that numerous transmitter-receiver systems are available on the market which perform the same function, such as remote registration or printing and the customer often specifies a particular "make" or brand of instrument system which is preferred by him. The size, shape, mounting provisions, etc., of the various transmitting devices vary widely. Thus while it would be possible, and probably obvious, to provide a new stack element for each different device, this is impractical because the large number of new elements which would be needed would require a large investment of time and money for development, tooling, inventory, etc. There are also practical limits for the height and weight of the stack which may be mounted on the meter. Thus the present problem is not solved by merely following the prior "stacking" practice.

Another alternative is that of custom designing and building the stack elements necessary to meet specific orders as they are received. However, the time required to fill an order and the cost of the elements would be prohibitive so that in the end either the business would be lost or the end result would be the same as that of the first mentioned solution.

The solution which I propose is to provide a single new element which will interfit with the meter, the local instruments and their shafts so as to retain the "stack" concept and its advantages. The new element will have a number of lateral faces each of which is contoured, provided with mounting pads, tapped holes, etc., necessary for mounting a specific type of local device along with a cover if required. In the event that one or more of the devices require explosion proof enclosure, the threaded conduit wire passage and sealing compound cavities may be provided in the new element adjacent the mounting face. The respective faces would be constructed to accept a transmitter which is widely used in industry. Thus provision can be made to mount at least four different transmitters or the like by the addition of only one element to the stack.

The new element will have its main shaft mounted so as to be coupled with the shafts of the vertically adjacent elements of the original packages and take-off gearing will be provided to drive individual shafts, which are journalled in the new element so that each will extend laterally from the main shaft to one of the faces of the element. The gear ratios will, of course, be such as to match the transmitter or other "local device" with the meter. The ends of the shafts will be provided with means for coupling them with the input shafts of the respective devices.

With respect to the local devices which are to be received by the new element, I propose that one face be constructed so as to accept a "Selsyn" transmitter because the "Selsyn" system is frequently used where an analog read out is required or where the torque load imposes by the remote instrument is relatively large.

Another face should be constructed so as to accept a generally used type of "pulser" or pulse transmitter because numerous receiver instruments such as registers, printers, predeterminers and other devices operate digitally in response to pulses.

A third face should be constructed to accept a generally used type of tachometer. In a dispensing apparatus the meter senses the rate of flow through it and data of this kind are frequently desired at either or both the metering and remote stations.

The fourth face is preferably constructed in the form of a common type of mount which comprises a flat pad which is provided with four tapped holes arranged to match a standard four-bolt flange. A centering groove is also provided so that the axial base flange of the transmitter device will accurately align the transmitter shaft with that of the new element.

One use for this output and face is to support and actuate the timing device for a liquid sampler which is usually located at the dispensing station.

Alternatively, a transition casting or plate which has one side formed to mount on the fourth face and its outer side formed accept the mounting of a specific local device which cannot be mounted on any of the other faces of the elements.

It may, of course, become practical to provide a special new element which has its faces constructed to accept a certain group of specific devices other than that mentioned, whenever the volume of demand for such a group reaches an economic level.

It may also become practical to employ two or three new elements, which could provide eight to 12 transmitter outputs or drives, especially in cases where the older stack elements, such as the printer, predeterminer, etc., are no longer required at the dispensing station. The height of such a stack would obviously not be greater than that already commonly reached, and the main limitation would be the total torque which would be imposed on the meter by the driven devices and the drive trains to such devices.

In view of the above background information it will be seen that one of the major objects of the invention is to provide a new stack element having a body and an input-output shaft which are constructed so as to interfit with corresponding parts of the stack elements of an existing metering apparatus, said new element having a plurality of output shafts extending substantially radially from and connected to be driven by the input-output shaft of the new element.

Another object of the invention is to construct the exterior of the body of the new element, in the regions adjacent the respective radial output shafts, so as to facilitate the accurate mounting of local instruments or transmitting devices thereon so as to properly align the input shafts thereof with the respective radial output shafts.

A further object of the invention is to provide means on said body, in said regions, for mounting covers on the body so as to enclose the respective instruments or devices which are mounted thereon.

Still another object of the invention is to provide means on said body, in certain of said regions, which coact with means on the corresponding covers to form an explosion proof enclosure for the instrument or device which is mounted in such region.

A further object is to provide, in the body, adjacent each explosion proof chamber, a wire passage which extends through the body, and from the outer surface of the body to the interior of said chamber, so that the chamber may be opened without disturbing the wires which are disposed in the passage.

Still another object is to provide the wire passage with a potting chamber and to provide means for attaching a wire conduit to said body in communication with said passage.

It is a further object to construct the body so as to facilitate mounting the transmitter of a remote, analog, shaft rotation system in one region, the transmitter of a digital pulsing system in another region and the transmitter of a tachometer system in a third region.

Yet another object is to construct the three regions of the body so as to accept, at least one commercially available transmitter which is made by a specific manufacturer and which is widely recognized by industry as being meritorious.

Another object is to provide the fourth region of said body with a pad having a flat surface which is perpendicular to and substantially concentric with the corresponding output shaft and to provide tapped holes in said surface so as to provide a standard mounting flange capable of receiving an instrument, transmission device or a transition piece which has a mating or companion flange.

A further object is to provide such transition piece with a radial flange having a planar surface opposed to that of the companion flange and which may be custom machined to accept any of a large variety of different brackets, etc., which may be provided as the supporting means of an instrument, transmission or other device.

Yet another object is to provide a cover for sealing the top of said body so that one or more of said new stack elements may comprise the total stack of the metering apparatus.

These and objects will become apparent from this specification and the drawings which form a part hereof and in which:

FIG. 1 is a diagram which shows the relation of the various figures which depict the six sides of the new stack element as it is shown in FIG. 2.

FIG. 2 is a sectional view taken substantially on the line 2—2 of FIG. 4, showing the output drive trains for the "Selsyn" and pulse transmitting devices.

FIG. 2A is a section taken substantially on line A—A of FIG. 2, showing the pulse transmitter magnet and its drive gearing.

FIG. 2B is a section taken on line B—B of FIG. 2 showing the pulse transmitter switch.

FIG. 3 is an elevation viewed from the right of FIG. 2, showing the top of the new stack element upon which another stack element or a cover may be mounted.

FIG. 4 is an elevation viewed from the left of FIG. 2, showing the bottom or input end of the new stack element which interfits with the output end of the meter body or of another stack element.

FIG. 5 is a sectional view taken substantially on the line 5—5 of FIG. 6 which shows a tachometer transmitter mounted on one side of the body of said new stack element and showing, in full lines, a housing for the transmitter in which a tachometer receiver is also mounted, said housing being attached to one face of said element, and showing in dot-dashed lines a cover for the transmitter only.

FIG. 6 is an elevation taken from the left of FIG. 5 to show the tachometer receiver and with parts broken away to show the wire passage through the body of the new element.

FIG. 7 is an elevation taken from the right of FIG. 5 to show the face of the new element served by the spare or general utility output shaft and to show the standard mounting means associated with said shaft.

FIG. 8 is an elevation taken from the bottom of FIG. 3 and showing another face of the new element and the housing for the pulse transmitter which is mounted on such face.

FIG. 9 is an elevation viewed from the top of FIG. 4 showing a "Selsyn" transmitter, means for mounting it and its cover on another face of the new element and with parts broken away to show the wire passage through the element body to the transmitter chamber.

FIG. 10 is a sectional view showing a "Selsyn" receiver, its casing, mounting and supporting means.

FIG. 11 is a block diagram showing a meter having a number of local instruments and a new element mounted in stacked relation on the meter to form, with a control valve, a metering apparatus package.

FIG. 12 is an end elevation showing a cover which may be attached to the top of the new element to seal it when it serves as the uppermost stack element or as the sole stack element of a metering apparatus package.

FIG. 13 is an end elevation showing a transition plate which is adapted to be mounted on the face of the pad shown in FIG. 7.

SPECIFICATION

Referring first to FIGS. 8 and 11, the latter shows a form which the dispensing apparatus package may take when the new element SE5 is included therein as discussed above. Numeral 1 indicates the volume meter, the body of which supports the stack of elements.

A "Preset" SE3, which is a presettable predeterminer, is shown superjacent the meter and forms the first and lowermost stack element. This is the usual level for this instrument when it is connected with control valve 19 by mechanical linkage 27. When the valve control system is hydraulic, electric, etc., the preset may be located at any level in the stack.

The new element SE5 is shown as the second stack element and is superjacent the preset, while a register SE7 and a ticket printer SE9 form the third and fourth elements of the stack which thus terminated with the printer.

Other forms of the package may include additional elements, or some of the elements shown may be omitted or may be located at levels other than those in which they are shown, unless there is some factor, such as the mechanical linkage of SE3, which favors the location of a particular element at a particular level.

The meter body supports an output shaft 11 so that its rotational axis extends substantially vertically through a top opening in an upwardly extending mounting means which is formed on the meter body and which surrounds the shaft. While the mounting means of the meter body is not shown separately, it has substantially the same form as that of the upper ends of the bodies of the other stack elements and it interfits with the lower end of the superjacent element body in the same way as the lower ends of all of the other element bodies interfit with the upper ends of the other subjacent bodies. Thus the structure of the bottom end of SE5 and its interfit with top end of SE3, as shown in FIG. 8, is a duplicate of that between the bottom end of SE7 and top end of SE5 shown in the same figure. The joint between the top of the meter body mounting and the lower end of SE3 is likewise the same so the description of the structure shown in FIG. 8 should suffice for all of the elements of the stack.

As shown in FIG. 8, the top end of the body 8 of SE3 has a circular, axial recess 4 which is coaxial with its output shaft 13 and which receives the circular, axial centering flange 6 of the body 45 of SE5. The input shaft 15 is supported in body 45 coaxial with flange 6 and is therefore substantially coaxial with shaft 13. Flange 6 interfits slidingly but closely in recess 4 and fastening means (not shown) are applied to hold bodies 8 and 45 assembled. As shown in FIG. 4, tapped holes 10 are provided in the bottom end of body 45 near the corners thereof which receive screws which pass through holes in the top end of body 8 in the usual manner.

Output shaft 13 of SE3 is adapted to slide freely into a sleeve type coupling part 59 which is pinned to the lower end of the input shaft 15 of SE5. The sleeve has a diametric end slot 22 which receives the cross pin 2 set in the shaft 13 near the upper end thereof. These elements constitute the complementary interfitting parts of an axially separable coupling which are assembled incident to the assembly of the bodies 8 and 45 in the stack. Thus both the element bodies and the shaft ends carry axially interfitting means to assist in holding the endwise arranged shafts in alignment.

The coupling between the shaft 15 and input shaft 16 of SE7 is effected by similar coupling parts which interfit coaxially as do the aligning flange 24 of the body 26 of SE7 and the recess 28 of body 45, as shown at the top of FIG. 8.

Output shaft 14 of the register is similarly coupled with the input shaft 17 of the printer (FIG. 11) and meter shaft 11 is likewise coupled with the input shaft 12 of the preset.

While I have shown a number of interlock means 23,25 running from various stack elements to the valve, it should be understood that these mechanisms are not necessarily linkages between these elements and the valve but merely indicate the function of preventing the operation of the valve until some operation or cycle has been completed by the element.

Numeral 23 represents an interlock mechanism which performs the function of preventing the opening of the valve until a ticket has been inserted in the printer and the type wheels thereof have been zeroized and printed out. Such an interlock could extend from the printer to the preset rather than to the valve. Numeral 25 represents an interlock mechanism which prevents opening of the valve until the register SE7 has been zeroized. Numeral 27 represents the trip mechanism which causes the closure of the valve when the preset amount has been delivered. Numerous interlock systems for performing these various functions are known in the prior art and it is not intended to refer to any specific system.

Referring again to FIG. 11, the new unit SE5 has, in addition to the input-output shaft means 15, four additional output shafts 91, 67, 113, and 141 which project substantially radially from shaft 15. The body 45 is shown as a cubic polyhedron and it could be made so as to have a larger (five or six) or smaller (three) number of lateral faces than the four faces 37, 39, 41 and 43 shown, which correspond, in order, with the four radial shafts which extend substantially perpendicularly through said faces. The legends (FIGS. 1 and 11) associated with the faces indicate face 37 and shaft 91 are intended to accommodate a Selsyn transmitter; face 39 and shaft 67 a pulse transmitter; face 41 and shaft 113 a tachometer or flow rate transmitter or a combined transmitter and receiver and face 43 and shaft 141 to accommodate an optional or spare system not specifically designated.

Diagram FIG. 1 correlates with FIG. 11 which shows the relation of the four lateral faces and top and bottom of element SE5 as the faces of a cube and keys each cube face to the number of the figure which discloses such face in detail.

Referring to FIGS. 2, 3 and 4, the case or body of the new stack of element 5 comprises a substantially cubical casting 45 which has a rigid arm 47 extending from the rear of the wall which defines the face 43, inwardly toward and intersecting the vertical, central axis of the case, and substantially parallel with but spaced slightly upwardly from the bottom end of the case. A similar arm 49 extends inwardly from the rear of face 41, parallel to but spaced downwardly from the top end of the case. The arms are perforated along said central axis and bearings 51, 53 are pressed therein so as to be concentrically aligned with the axis. The main shaft 15 is rotatably mounted in the bearings and snap rings 55, 57 are mounted on the shaft, outwardly of the respective bearings so as to coact with the outer ends thereof to limit the end play of the shaft.

The lower end of the shaft has fixed to it the slotted half 59 of an axially separable coupling while the upper end of the shaft is provided with a crosspin 61 which constitutes the complementary half of a similar coupling. Four tapped holes 10 are formed in the bottom of the body to receive screws which hold it on the subjacent stack element.

A hollow, cylindrical boss 63 extends inwardly from the rear of the pulser face 39, perpendicular thereto, and so that its longitudinal axis perpendicularly intersects the axis of shaft 15. A tubular bearing 65 is pressed into the boss so as to allow its inner end to project slightly from the inner end of boss. An output shaft 67 is rotatably supported in the bearing and projects inwardly beyond the end thereof so as to receive a bevel gear 69 which is pinned to the end of the shaft. A snap ring 71 is mounted on the shaft for contact with the protruding end of the bearing so as to properly position the gear relative to the shaft 15.

The other end of the bearing 65 terminates inside of the boss and short of the end of shaft 67, which also terminates in the bore intermediate the end of the bearing and the face 39. The end of the shaft has an axial bore 73 which is intersected by a diametral end slot 75 adapted to receive the inner end of the pulser input shaft 77 and its cross pin 79 respectively.

A bevel gear 81 is pinned to shaft 15 so as to mesh with gear 69 to complete the drive train for the pulse transmitting device indicated generally by 83, which will be described in detail below.

The case wall which defines the Selsyn face 37 is provided with an inwardly extending, large diametered, cup-shaped boss 85 which is surmounted by a hollow, cylindrical boss 87. A bearing 89 is pressed into the latter and an output shaft 91 rotates in the bearing. The outer end of the shaft extends into the cavity 93 defined by boss 85 and has one part 95 of an axially separable coupling fixed to its end. A bevel gear 97 is pinned to the inner end of the shaft. The shafts 91 and 67 are coaxial so that gear 97 also meshes with gear 81 on shaft 15. A snap ring 99 is mounted on shaft 91 so as to coact with the protruding end of bearing 89 to hold said gears in mesh.

Coupling part 95 engages with a complementary part 101 which is fixed to the end of the input shaft 103 of a Selsyn transmitting device indicated generally by numeral 105, to complete the input drive train thereof.

Referring now to FIG. 5, the case wall, which defines the rate of flow or tachometer face 41, also defines an inwardly extending, cup-shaped boss 107 which is surmounted by a hollow, cylindrical boss 109. A bearing 111 is pressed into the boss 109 for rotatably supporting the output shaft 113 so that its rotational axis will intersect that of shaft 15 perpendicularly, at a point intermediate gear 81 and the bearing 51.

One end of shaft 113 extends into the cavity 115 defined by boss 107 and has one part, 117, of an axially separable coupling fixed thereto so as to interfit with a complementary part 119, which is fixed to the input shaft 121 of the tachometer or rate of flow transmitting device, indicated generally by numeral 123.

The other end of shaft 113 has a bevel gear 125 fixed to it, which is held in mesh with a gear 127, fixed to shaft 15, by the coaction of the snap ring 129 with the protruding end of bearing 111. This structure constitutes the drive train for the rate of flow transmitter. It should be noted that the ratio of the gearing 127, 125 may be altered by substituting gears which will provide a different ratio, to accommodate the rate of flow system to meters having greater or smaller displacement per revolution of the meter output shaft 11. This would require a different rate of flow scale in the rate of flow receiving instrument as will be discussed below.

Again referring to FIG. 5, a hollow, cylindrical boss 131 extends perpendicularly inward from the case wall which defines the optional instrument face 43. The central axis of this boss intersects the axis of shaft 15 and is preferably provided with the inwardly protruding inner bearing 133 and an outer bearing 135 which terminates short of the inner face of a recess 137 formed in the boss 139 which extends outwardly from the wall which defines this face. A shaft 141 is rotatably mounted in these bearings and carries a snap ring 143 and gear 145 at its inner end. The opposite end of the shaft extends beyond the surface of the boss and has a cross pin 147. A seal 149 for the shaft is supported in the recess 137 so as to prevent liquid (such as rain), dust, etc., from entering the case. A bevel gear 151 on shaft 15 meshes with gear 145 to complete the drive train for shaft 141.

As shown in FIG. 7 the boss or pad 139 is preferably square and provided with tapped mounting holes 153 so that a local device or a transmitter of some kind may be mounted thereon.

The face of the boss is also preferably provided with circular groove 155 to receive a centering ring which is coaxial with shaft 141. The size of the boss, the hole spacing and the centering groove dimension are preferably chosen so as to conform with established standards, so as to maximize the number of devices which could be mounted directly on this face. Devices which do not conform with this structure may be dealt with by providing a stock transition piece 337 (FIG. 13) which has one side provided with a flange 339 formed to fit on the boss and the other side comprising a blank flange 343. The two sides are preferably spaced by an intervening hub 341. Flange 339 would carry the axial centering flange 345 to enter groove 155 and would be perforated at 347 in alignment with holes 153. The hub is of course bored axially at 349 to clear the shafts and their coupling.

The blank flange 343 may thus be machined as needed to accept or to provide the means for mounting the device or instrument which is needed.

Two bosses 157, 159 are formed on face 43 adjacent boss 139 and with the wall of the case, define wire passages 161, 162 and potting chambers 164, 166 and threads 168, 170 to receive, respectively, wires, potting compound and rigid wire conduit (FIGS. 9 and 8).

Referring to FIGS. 2 and 9, a number of ribs 163 extend outwardly from the face 37 and their ends merge into the sides of a number of spaced, similarly extending bosses 165 to form a continuous wall which outlines a space 167. The plane of the wall is shown in FIG. 9 in which the bolt flange of the cover 173 comprises rib covering portions 169 and boss covering portions 171 of substantially the same size, shape and pattern as the body ribs and bosses. Bosses 165 are tapped and the flange portions 171 are perforated to receive screws 175 which hold the cover 173 in place on the wall formed by 163, 165 and form therewith an explosion proof chamber for the "Selsyn" transmitter 105. Shaft 91 defines in bearing 89 a flame path seal for this chamber.

An L-shaped bracket 177, made of angle iron, has short and long arms 179, 181, the first being fastened by screws 185, to the ends of two additional bosses 183, which project from face 37, parallel with bosses 165 and to the same height. Only one boss is shown (FIG. 2).

The mounting bracket 187 of the transmitter is connected with arm 181 of the bracket by bolts 189.

FIG. 9 shows the cover 173 and body 45 partially broken away through the boss 157 of FIGS. 4 and 7 and FIG. 4 shows that the wire passage 161 thereof bends so as to enter the explosion proof chamber. Thus the wires R1, 2, 3, and S1, 2 which connect the correspondingly designated terminals of the transmitter 105 with the receiver 199 (FIG. 10), are sealed by the potting compound which is installed in chamber 164.

The wire conduit screws into the thread 168 formed in the boss. Cover 173 may thus be removed, by removing screws 175, to expose the transmitter and its terminals without disturbing the wiring, potting, or rigid conduit.

Referring to FIG. 10, the receiving apparatus comprises a supporting body 201 which is generally cylindrical in form and has a radial mounting flange 203 which is perforated at 205 to receive fasteners by which it may be secured to a horizontal or upright panel, depending upon the nature of the output instrument which is to be driven by the receiver 199. The body is truly cylindrical above this flange and is provided with a counterbore 193 which is coaxial with the upper end, for centering an axial flange of the driven instrument. An opening must be provided in the panel through which the lower portion of the body may be passed.

A transverse wall 215 closes off the body at a level between the flange 203 and the lower end of the body. This wall is parallel with flange 203 and has two cylindrical bosses 217 extending downwardly therefrom to the level of the lower end of the body. The lower ends of the bosses are tapped to receive screws 225 which support an L-shaped angle bracket 219 which is similar to bracket 177 of the transmitting device. Receiver 199 has a mounting bracket 221 which is mounted on 219 by bolts 223.

A boss 227 extends radially outwardly from the lower part of the body and is formed with a wire passage 229, a potting chamber 231 and threads 233. Thus the wires designated R1, 2, 3 and S1, 2 of the receiver may be passed out of the explosion proof chamber which is defined by the cover 211 and body 201 through the wall of the body 201, so that the cover may be removed without disturbing the wiring or wire conduit.

A hollow cylindrical boss 232 extends upwardly from wall 215 coaxially with the circular upper end of the body. Bearings 235, 237 are pressed into the opposite ends of the boss and protrude slightly beyond said ends. A shaft 239 is rotatably mounted in the bearings and carries snap rings 241, 243 adjacent its supper and lower ends which coact with the protruding ends of the bearings to limit shaft end play.

One half of an axially separable coupling 245, 247 is pinned to shaft 239 and the other half to shaft 249 of the receiver. The other end of 239 carries a cross-pin 251 which is adapted to engage an end slotted coupling part carried by the shaft of the output instrument (not shown) which is to be driven.

Separate means may be provided for attaching the output instrument to the body 201 or to the panel, although in some cases, some of the holes 205 may be tapped to receive screws for holding the instrument on the body while other of said holes are used to mount the body on the panel.

The "Selsyn" System produces an analog, as distinguished from digital, movement of shafts 239, 249. It has a relatively high output torque so that it is capable of driving a register SE7 or a printer SE9 or possibly both. In such case, these instruments might be eliminated from the stack employed at the metering station.

The pulsing device or pulse transmitter, which is mounted on face 39 of the new stack element body 45, is best shown in FIGS. 2, 2A, 2B, and 8.

As viewed in FIGS. 2 and 8, a series of connected ribs and bosses 252, 253 underlie the bolt flange 255 of cover 257 to form, with said cover, an enclosed explosion proof chamber 259. The wire passage 162 of boss 159 (FIGS. 4 and 7) extends through body 45 and bends so as to guide the wires into said chamber. A wire conduit may be screwed into threads 170 of the boss. Thus the cover 257 may be removed without disturbing the wires, their seal or the rigid conduit.

A pair of small bosses 263 (FIGS. 2 and 2B) extend outwardly from the face 39 toward the cover and are tapped at 265 to receive screws 267 which hold the pulsing device 83 in place on body 45. This mechanism comprises a number of parallel, spaced plates 269, secured together as a unit and which support a gear train 271 which is driven by shafts 15, 67 and 77 described above. The output shaft 273 of this train 271 drives a magnet 275 (FIG. 2A) which alternately reverses a single pole, double throw switch 277. The input terminal 279 and the two output terminals 281A, 281B may be connected so as to provide a substantially square wave output to a receiver or, if desired, only one of the 281 terminals may be used so as to provide merely an "on and off" pulse output. The mechanism described is manufactured commercially by Disc Instruments, Inc., which refers to it as a "Rotaswitch."

Referring to FIGS. 4, 5 and 6 the face 41 of body 45 is used to mount a tachometer type of transmitting device 123 which, with its receiver 301, provides data relating to the rate of flow of fluid through the meter 1. The device 123 is mounted by means of a bracket 283 and screws 284 on tapped cylindrical bosses 285 which extend outwardly from the wall of body 45 a distance equal to the height of the enclosing wall 287 which is defined by four relatively straight ribs 289 which merge with four, parallel corner bosses 291 (FIG. 6).

As shown in the lower right corner of FIGS. 4 and 6, a wire passage 293 extends through the wall from face 39 and bends so as to pass through the wall and face 41, and opens within the space defined by the ribbed wall 287 and the cover 303. This wire passage is provided with a potting chamber 295 and a tapped conduit receiving opening 297 which is formed in boss 299 of the body 45 (FIG. 8).

When a remote "Westach" receiver is used, four connecting wires, P1, 2, 3 and 4, are needed and are passed through 293 from transmitter 123 to a receiver similar to 301. When another known system is employed, only two wires, Q1 and 2, are run to the remote receiver.

In the full line construction of the cover 303, which is shown in FIG. 5, a receiver 301 is mounted on the body 45 along with the transmitter and is therefore a local instrument of the metering station. In this case no wires will be taken out through the wire passage 293 unless a remote receiver is also used. The cover 303 is mounted on the body 45 by means of screws 305 which pass through holes in the bolt flange 307 of the cover and center tapped holes in the corner bosses 291. The cover and body 45 cooperate to form a sealed chamber for the devices which are disposed within the cover.

The receiving instrument 301 has a generally cylindrical body which is provided with a circumferential flange 319. The body passes through a circular opening 323 in the end 321 of cover 303 to the point that flange 319 comes into engagement with the end of the cover. A U-shaped clamp 325 has its free ends engaged with the inside of the end of the cover. The middle portion of the clamp is centrally perforated so as to receive the central mounting stud 327 of the instrument. A nut 329 is mounted on the stud with the clamp between it and the end of the instrument so that as the screw is tightened, the flange 319 and free ends of the clamp are urged toward the outside and inside respectively, of the end of the cover. The instrument is thus firmly anchored on the cover and the flange 319 provides the required seal at the opening through the cover.

When no local receiver is used but a remote receiver is to be connected with the transmitter, the required number of wires are run from the transmitter, through the passage 293 to the remote receiver. Since the cover 303 now houses only the transmitter 123, the cover is reduced in length and terminates in a continuous wall 331 as indicated by the dot-dash lines in FIG. 5.

In the event that the remote receiver is located in a protected area, such as a control room, a cover similar to 303 may be omitted and the instrument may be mounted in a hole in a panel similar to the opening 323 in the cover by using the flange 319 and clamp 325.

If the remote indicator is to be located in an unfavorable area, a two part housing may be provided therefor, one part of which comprises base mounting element similar to the wall of 45 which has the wire passage structure 299 and the sealing wall 287 on the other part comprises the short cover shown by dashed lines 331, but in such case the end wall thereof will have an opening 323 to permit the receiver to be mounted on the cover.

It should be understood from the above that at least three basic forms of the tachometer system are contemplated, namely one in which the transmitter only is mounted on SE5 and the receiver is remote, and is connected by wires to the transmitter; another in which both the transmitter and the receiver are mounted on SE5 and a third in which the transmitter and a receiver are mounted on SE5 and a remote receiver which is also connected by wires with the transmitter.

Tachometers of the kind disclosed are commercially marketed by Westberg Manufacturing Company under the name "Westach." The transmitting devices are available in a variety of ranges along with the corresponding receivers. The data is displayed at the receiver by a pointer 333 which moves relative to a fixed scale 335 which may be calibrated to read the rate of flow directly in terms of any desirable units, i.e., gallons per minute, liters per minute, etc.

It is then seen that by the provision of a single, new stack element, the number of different combinations of data output shafts which are available at either or both, the metering or the remote stations has been substantially increased in a highly practical and feasible manner. Furthermore, it is possible to provide any and all of the package units which were previously available, as well as package units which include combinations of both the old and the new elements. It is also quite feasible to produce a package which comprises merely the meter 1, the valve 19 and the new element 5, since the printer, register and predeterminer can be disposed at the remote station so as to be operated by the receivers of the Selsyn and/or pulsing, etc., transmitters and the valve can be operated by means of a circuit which is controlled by the remote predeterminer.

In the above example it may be necessary or desirable to provide the cover 311 for the top end of the body 45 shown in FIG. 12. The cover has an alignment ring 313 adapted to enter the counterbore 315 of body 45, as shown in FIGS. 2 and 3. Screws (not shown) pass through the holes 316 of the cover to enter the tapped holes 317 of the body to hold the cover in sealing relation on the body.

It should perhaps be noted that one of the problems related to the "stacking" of too many elements is that of maintaining the proper alignment of the shafts and couplings of the various elements of the stack. Perfect alignment is practically impossible to establish and maintain so the increase in the number of stack elements results in a considerable addition to the torque load imposed on the meter by the operation of the elements per se. Any torque tends to produce slippage of the meter which results in lowered accuracy of the data.

Since the five shafts 15, 67, 91, 113 and 141 are all supported in the unitary body 45 and, since all of the new transmitting or other devices, including their shafts, are also mounted directly on the body, the proper machining of the body virtually assures the attainment of the proper alignment of the various driving and driven shafts with respect to each other as well as the alignment and proper interfitting of the coacting coupling parts and the proper meshing of the various gear sets corresponding to such shafts. The torque load resulting from misalignment is accordingly minimized and a higher accuracy will be obtained than could be expected if four additional stack elements had to be added to provide the additional outputs.

While a specific embodiment of the invention has been disclosed in this application for purposes of illustration, it is desired that the protection afforded by any patent which may issue hereon be not limited to said embodiment but that it extend to any structure which may fall fairly within the scope of the claims appended hereto.

What I consider new and patentable is hereby claimed by me as follows:

1. In a dispensing apparatus comprising a fluid meter having a body, an output shaft mounted therein for rotation about a substantially vertical axis and connected to rotate in proportion to the volume of fluid dispensed,
    a. said body having a stack element mount, having a top end disposed substantially normal to the axis of said shaft and defining an opening through which said axis extends,
   a number of stack elements, each having input-output shaft means mounted therein for rotation about an axis, and having top and bottom ends disposed substantially normal to said axis, said ends each defining an opening through which the shaft axis extends,
    b. a first coupling part mounted at the free end of the input shaft means and a second coupling part mounted at the free end of the output shaft means of each element and of the meter, said first and second coupling parts having interfitting torque transmitting means constructed so as to be engaged by axial movement of a superjacent input shaft means toward a coaxially aligned, subjacent output shaft means,
   first element aligning means disposed at the top end of each stack element and of said mount, second element aligning means disposed at the bottom end of each element, said first and second element aligning means including axially engageable interfitting means disposed so as to engage upon movement of a superjacent second aligning means toward a subjacent first aligning means when the corresponding input-output shaft means and coupling parts are aligned,
    c. fastening means for holding said stack elements and meter mount together to form a dispensing apparatus, each of said elements including mechanism connected to be driven by the input shaft means thereof,
   the improvement wherein said apparatus includes a stack element having a hollow body defined by a number of contiguous lateral walls each having an outer face, the said walls and their faces being disposed substantially tangentially about the axis of the input-output shaft means of said element,
    d. the driven mechanism of said element including an output shaft for each face, means for supporting each output shaft for rotation about an axis which extends substantially radially from said input-output shaft axis and substantially perpendicular to the associated face, means connecting each output shaft to be driven by said input-output shaft means, each output shaft extending through and beyond its associated face and having a coupling part fixed at the free end thereof, and wherein
    e. certain of said faces include mounting means adapted to receive a transmitting device, the mounting means of each such face being specifically adapted to receive a selected one of a number of different types of transmitting devices, each of which includes a rotary input shaft having a coupling part fixed at the free end thereof, the mounting means of each face including means for positioning the selected device with its input shaft in substantial axial alignment with the corresponding output shaft and with the coupling parts of said shafts in driving engagement, and means for holding said device in such position.

2. The structure defined by claim 1 which includes an individual cover for each of certain of said devices, each cover and the corresponding face of said element including coacting means adapted to position said cover relative to said device and to define, with said element and said cover, an enclosure for said device when the cover occupies said position, and means for holding the cover in said position.

3. The structure defined by claim 2 wherein said coacting means include means for sealing said enclosure when said cover occupies said position.

4. The structure defined by claim 2 wherein said element includes means defining a wire passage for each of said enclosed devices, each of said passages extending through an exterior surface of said element at one end and extending into the element enclosure at the other end.

5. The structure defined by claim 4 wherein said wire passage defining means also defines a circumferential enlargement of said wire passage near said one end thereof, to serve as a chamber for wire potting material.

6. The structure defined by claim 4 wherein said element includes means for positioning a tubular wire conduit in communicating relation with said wire passage at said one end thereof, and means for fastening said conduit to said element in such position.

7. The structure defined by claim 1, wherein one of said devices is a Selsyn transmitter having an elongated body and having the input shaft thereof extending from one end thereof, a bracket having a first leg with a second leg extending substantially at right angles therefrom, means for fastening said 1st leg to said body substantially parallel to the shaft axis, and wherein said mounting means of the associated face includes means formed so as to engage with said second leg and disposed in the path thereof, for engagement thereby, when said output shaft of said face and the input shaft of said device are in substantial axial alignment with the coupling parts thereof drivingly engaged, and means for fastening said second leg to said element to maintain said shafts aligned and said coupling parts engaged.

8. The structure defined by claims 1 wherein one of said devices is a pulse transmitter having an input shaft extending from one end thereof and having first stop means of said end thereof, and wherein the mounting means of the associated face comprises second stop means disposed in the path of said first stop means, for engagement thereby when said shafts are in substantial coaxial alignment and the coupling parts thereof are in driving engagement, and means for fastening said device to said element to maintain said shafts aligned and said coupling parts engaged.

9. The structure defined by claim 1 wherein one of said devices is a tachometer transmitter having a body with said input shaft extending from one end thereof, a bracket having first and second legs connected by a transverse member, means for connecting said first leg to said body, and wherein the mounting means of the associated face comprises means disposed in the path of said second leg, for contact thereby when said shafts are in substantial coaxial alignment and said coupling parts are in driving engagement, and means for fastening said second leg to said element to hold said shafts aligned and said coupling means engaged.

10. The structure defined by claim 2 wherein one of said devices is a tachometer transmitter and wherein said structure includes a tachometer readout instrument having means for visually displaying data thereon, means connecting said device to actuate said instrument, said cover defining a window, means for mounting said instrument on said cover so as to render said data display means visible from the exterior of the cover, and sealing means disposed relative to said window and said instrument so as to maintain the enclosure for said device intact.

11. The structure defined by claim 1 wherein one of said faces includes means adapted to accept a companion flange, said means comprising a pad having a planar surface disposed substantially perpendicular to and intersecting said associated output shaft, said pad defining openings adapted to receive fastening means for holding a companion flange on said surface and defining centering means disposed concentrically with respect to said shaft and adapted to interfit with complementary centering means on such companion flange.

12. The structure defined by claim 11 which includes means disposed about said output shaft adjacent said planar surface and having sealing engagement with said shaft and pad, to prevent the passage of foreign matter through said pad toward the interior of said element.

13. The structure defined by claim 11 which includes a transition piece having a companion flange at one end and a radial, planar mounting face at the opposite end, said piece defining an opening therethrough adapted to receive the coupling parts of said output shaft and an input shaft, said flange having a planar surface disposed perpendicular to the axis of the opening, having centering means disposed coaxially of said axis and constructed so as to interfit with the centering means of said pad and defining openings which are disposed so as to be in axial alignment with the openings defined by said pad when the flange is mounted thereon with the aligning means engaged.

14. The structure defined by claim 1, wherein said output shaft supporting means comprises bearing means mounted in openings defined by the walls of said element, and means on each output shaft, disposed for engagement with the corresponding bearing means, for limiting the axial translatory movement of such shaft relative to its bearing means.

15. The structure defined by claim 1 wherein said dispensing apparatus comprises a meter and only one stack element and wherein said element consists of said improved element which has a number of said devices, each of which is mounted on the face of said element which specifically adapted to receive such device, with the corresponding shafts substantially coaxially aligned and with the corresponding coupling parts drivingly engaged, and means for connecting said meter, said element and said devices together to form a unitary dispensing apparatus package.

16. The structure defined by claim 15 which includes a cover for each device, each cover and the corresponding face of said element including coacting means adapted to position said cover relative to said device and to define, with said element and cover, an enclosure for said device, and means for removably fastening said cover to said element to maintain said enclosure intact.

17. The structure defined by claim 15 wherein one of said faces includes a flange mounting pad, said pad defining an opening through which the corresponding output shaft extends, a mechanism having a flange constructed to fit on said pad, said mechanism having an input shaft and a coupling part thereon disposed so as to coaxially align said shafts with said coupling parts drivingly engaged when said flange is fitted on said pad, and means for fastening said flange to said pad so as to incorporate said mechanism as an integral part of said unitary package.

18. The structure defined by claim 15 wherein one of said faces includes a flange mounting pad, said pad defining an opening through which the corresponding output shaft extends, a mechanism having a specific mounting means and having an input shaft with a coupling part fixed thereto, a transition piece defining a passage from end to end thereof which is large enough to freely admit said coupling parts, said piece having a flange at one end constructed so as to fit on said pad and having adapting means at the other end constructed so as to receive the specific mounting means of said mechanism and so as to coaxially align said shafts with said coupling parts drivingly engaged when said flange is fitted with said pad and when said specific mounting means is received by said adapting means, and means for fastening said mechanism, said piece and said element together so as to incorporate them as integral parts of said unitary package.

19. The structure defined by claim 15 which includes a cover for the upper end of said element, said cover including second aligning means disposed at the lower end thereof and mounted in interfitted relation with the first aligning means of said element, and means for releasably holding said cover on said element.

20. The structure defined by claim 2 which includes a cover for the upper end of the uppermost element of said stack, said cover including second aligning disposed at the lower end thereof and mounted in interfitted relation with the 1st aligning means of the uppermost element of said stack, and means for releasably fastening said cover on said uppermost element.

* * * * *

UNITED STATES PATENT OFFICE
CERTIFICATE OF CORRECTION

Patent No. 3,670,317  Dated June 13, 1972

Inventor(s) Lester R. Overy

It is certified that error appears in the above-identified patent and that said Letters Patent are hereby corrected as shown below:

The title of the invention should read -- Instrument Drive System for Fluid Metering Apparatus -- . Column 16, line 27, "ahchored" should read -- anchored -- .

Signed and sealed this 20th day of March 1973.

(SEAL)
Attest:

EDWARD M. FLETCHER, JR.
Attesting Officer

ROBERT GOTTSCHALK
Commissioner of Patents